Patented Jan. 6, 1942

2,268,620

UNITED STATES PATENT OFFICE 2,268,620

INSOLUBLE AMMONIA-HYDROCARBON DIHALIDE CONDENSATION PRODUCTS

George W. Rigby, Wilmington, Del., assignor to E. I. du Pont de Nemours & Company, Wilmington, Del., a corporation of Delaware No Drawing. Application December 21, 1939, Serial No. 310,441

17 Claims. (Cl. 260—2)

This invention relates to synthetic resins, and more particularly to synthetic resins capable of acting as anion exchangers in the treatment of aqueous solutions.

This invention has as an object the preparation of nitrogen-containing resins which are insoluble in neutral, dilute acidic, and dilute basic aqueous solutions. A further object is the preparation of such resins by the reaction of hydrocarbon dihalides with ammonia. A still further object is the preparation of basic resins capable of exchanging anions in water purification. Other objects will appear hereinafter.

These objects are accomplished by the following invention of water-insoluble, dilute acid-insoluble, dilute alkali-insoluble, organic solvent-insoluble, basic, resinous reaction products of hydrocarbon dihalide and ammonia in amount such that there is, in the absence of other bases, at least one molecular proportion of ammonia for each atomic proportion of halogen in the dihalide or, in the presence of another base, at least one-fourth molecular proportion of ammonia for each atomic proportion of halogen under suitable reaction conditions as set forth more fully below.

The process of the present invention comprises conducting a reaction at an elevated temperature, i. e., 30–90° C. between ammonia and a hydrocarbon dihalide in which the halogen atoms are attached to different singly bonded aliphatic carbon atoms, the ammonia being present in an amount such that, in the absence of other bases, there is at least one ammonia-nitrogen atom for each halogen atom in the reaction mixture or, in the presence of other bases, there is at least one-fourth as many ammonia-nitrogen atoms as halogen atoms, at least until a water- and dilute acid-insoluble resin is obtained. In the prefered but not exclusive embodiment of this invention, the reactants are so selected that the functional groups (i. e., the two halogen atoms) of the dihalide are separated by six or more contiguous carbon atoms. There may also be present in the reaction mixture other materials such as potassium iodide as a catalyst, and caustic soda or dimethylaniline as acid acceptors. The products of this invention are resins containing nitrogen in the amine state, said resins being substantially insoluble in all common solvents. In particular, the resins are insoluble in water, in 5% aqueous acetic acid, and in 5% aqueous sodium hydroxide.

The more detailed practice of the invention is illustrated by the following examples, wherein parts given are by weight. There are of course many forms of the invention other than these specific embodiments.

Example I

Trimethylene dibromide (1362 parts) and anhydrous ammonia, i. e., liquid ammonia at its boiling point, ca. —33° C. (1847 parts) are placed in a glass lined autoclave capable of withstanding the pressures built up by anhydrous ammonia at elevated temperatures. The autoclave is hermetically sealed and then heated at a temperature of 85° C. for 9 hours. After the vessel is cooled and opened, the unreacted ammonia is allowed to evaporate. The remaining contents consist of 1333 parts of a spongy colorless solid mass. The crude reaction product is subjected to steam distillation which removes from it 168 parts of trimethylene dibromide. The residual solid material is digested with hot water, separated by filtration, and thoroughly washed with water. From the aqueous filtrates, 480 parts of trimethylenediammonium bromide can be obtained by suitable procedures. The product, separated by filtration, is a solid, substantially water-insoluble resin (203 parts).

Example II

Hexamethylene dibromide (60 parts) and 170 parts of anhydrous ammonia are placed in a glass lined autoclave as described under Example I and heated at 50° C. for 20 hours. The colorless, solid, resinous product (72.3 parts) is thoroughly washed with water and is then extracted with 10% potassium hydroxide solution. After being further washed with water, which removes all water-soluble material from the resin, the resinous reaction product is capable of absorbing acid from aqueous solution, although the product is wholly insoluble in acidic as well as in basic aqueous solutions. For example, 10 parts of the dry resin absorbs sulfuric acid from a 0.1 normal aqueous solution percolated through it until it has removed more than 3.4 parts of the acid. In other words, the resin has the properties of a base whose neutral equivalent is at most 143. The nitrogen content of the resin is 8.62%. The dried material is markedly swelled by aqueous solutions but it is insoluble in them and also in all organic solvents and combinations thereof. The resin is even insoluble in cold concentrated (95%) sulfuric acid.

Example III

A glass-lined pressure vessel is charged with 196 parts of ethylene dichloride, 68 parts of anhydrous ammonia, 80 parts of sodium hydroxide, and 1 part of potassium iodide, then heated in an autoclave for 10 hours at 60° C. under nitrogen pressure (ca. 400 lb. per sq. in.) sufficient to counterbalance the pressure developed by the heated ammonia, in order to minimize volatilization of the reactants. After cooling and opening the autoclave, the contents of the vessel are washed out with water, leaving a nearly white, gelatinous solid, (15.4 parts dry weight) which is separated by filtration. In order to remove ionically bound chlorine from the resin, the insoluble gelatinous material is digested on a steam bath for 2 hours with 4% sodium hydroxide and is then washed with water on a filter until the filtrate is substantially free of chloride ions and caustic soda as determined by tests with silver nitrate solution and with litmus paper, respectively. The resin, thus purified, is found by analysis to contain 55.77% carbon, 9.32% hydrogen, 10.85% nitrogen, and 4.66% chlorine. This material has no detectable solubility in organic solvents, in water, in 5% acetic acid, or in 5% sodium hydroxide although it is swelled by aqueous media. The resin (two parts) is able to absorb 0.65 part of sulfuric acid from a 1/300 molar sulfuric acid solution. This basicity corresponds to a neutral equivalent of 150 for the resin.

While several hydrocarbon dihalides have been disclosed in the above examples, the process of the present invention is generic to hydrocarbon dihalides, preferably those wherein the halogen has an atomic weight at least as great as that of chlorine, i. e., more than 35, i. e., chlorine, bromine, and iodine, in which halides the halogen atoms are attached to different, only singly bonded, aliphatic carbon atoms, including, for example, ethylene dibromide, trimethylene dichloride, 2,3-dichloropentane, hexamethylene dichloride, decamethylene dichloride, decamethylene dibromide, propylene dichloride, 1,2-dichloropentane, 1,4-dichlorobutene-2, 1,4-dibromocyclohexane, 2-methyl-1,4-dichlorobutene-2, 1,4-di(chloromethyl)benzene, 1-bromo-6-chlorohexane, 1,12-dichlorooctadecane, and 1-chloro-10-iododecane. Mixtures of two or more hydrocarbon dihalides may also be used.

There must be a quantity of base (including ammonia) present in the reaction mixture chemically equivalent to the halogen present, i. e., one mol of monoacid base, one-half mol of diacid base, etc. or greater; of the base, there must be at least one-fourth equivalent of ammonia for each halogen atom, or more. In the absence of other bases, additional ammonia is required as an acid acceptor and there must consequently be employed one ammonia molecule for each halogen atom. Other suitable bases which may be present as acid acceptors, in addition to the sodium hydroxide mentioned in Example III, include other basic metallic hydroxides and oxides, and tertiary organic bases such as dimethylaniline, pyridine, and quinoline, i. e., any base which is free from amino-hydrogen. Any quantity of acid acceptor may be employed, and for each one-fourth of a molecular proportion of a monatomic base present, relative to proportion of halogen atoms present, the requirement of ammonia is reduced by one-fourth of a molecular proportion until, when at least three-fourths proportions of such base is present, the minimum requirement of one-fourth proportion of NH3 obtains. It is also often preferable, though not essential, to include a catalyst, which may be any metallic iodide such as calcium iodide or potassium iodide. It is further within the scope of this invention to employ mixtures containing diluents, i. e., materials which do not enter into the reaction, but may allow it to proceed more smoothly or completely. Examples of such diluents are benzene, dioxane, and ethanol.

The preferred temperature for conducting the reaction depends upon the ingredient employed, since different dihalides have different optimum reaction temperatures, but in general a temperature of 90° C. or below is preferred. The reaction is continued at least until a water- and dilute acid-insoluble resin is formed. The reaction may be allowed to continue still longer without detriment to the reaction products.

The reaction may be accomplished at subatmospheric, at atmospheric, or at superatmospheric pressures.

It is not essential that the reactants be maintained in the liquid state. Thus, pressures insufficient to prevent total vaporization of ammonia or other reactants are operable, and ammonia may be employed at a temperature above its critical point (132.9° C.). The pressure developed by a reaction mixture containing anhydrous ammonia at 150° C. might properly be approximately 2000 lbs./sq. in.

The usefulness of this invention depends upon the insolubility and the ammonia-type nitrogen content of the reaction products, which makes them eminently suitable as anion exchange resins. The superlative effectiveness of the insoluble basic resins produced by the process of this invention in technically important operations is indicated in the following example describing the utilization of a representative resin in a typical anion-exchange process.

*Example IV*

Ten parts (dry weight) of resin prepared from hexamethylene dibromide and ammonia as described in Example II is moistened with water and packed in a glass tube 32 mm. in diameter fitted at the bottom with a stopcock above which is a perforated glass filter plate covered with a disk of glass cloth. After saturating the resin with hydrochloric acid, an aqueous solution of sodium sulfate (0.0035 molar) is percolated through the resin at the rate of 200 cc. per hr. Each 100 cc. portion of filtrate is separately examined in succession for the presence of sulfate-ion by a test comprising the addition of barium chloride solution under conditions such that a sulfate concentration 0.001 as great as that in the percolating solution can be readily detected. The exchange of chloride-ion for sulfate-ion by the resin is substantially complete as judged by the negative test for sulfate-ion in the effluent. A total of 1.7 parts of sodium sulfate, after the percolation of its solution through the resin, is thus converted to sodium chloride solution before the succeeding portion of the effluent contains traces of sulfate-ion. Thus the "exchange equivalent" of the resin, i. e., the weight of resin capable of effecting complete anion-exchange on one equivalent weight of salt, is 408. The resin can be regenerated, that is, prepared for a repetition of this process, through removal of the accumulated sulfate-ion by treatment with a solution of a chloride. Under the same conditions of evaluation, a commercial anion-exchange resin, prepared from meta-phenylenediamine and formaldehyde converts 0.37 part of sodium sulfate in 0.0035 molar solution to sodium chloride. This corresponds to an exchange equivalency of 1910 for the resin.

The anion-exchange operation illustrated in the foregoing example can be advantageously employed in the following useful processes: (1) The preparation of substantially electrolyte-free water or other liquids by complete removal of the anion content, in conjunction with a cation-exchanging resin used to remove cations. (2)

The substitution of a harmless anion for an injurious one in preparing water suitable for special purposes. (3) The preparation of water-soluble inorganic salts by an exchange of one type of anion present in the resin for another anion present in a solution in contact with the resin. (4) The resins are also suitable as matrices for preparing organic pigments by absorbing an appropriate dye-stuff in the insoluble resin. (5) Acidic impurities may be absorbed from gases and non-aqueous liquids by a filter composed of an anion-exchange resin.

In the process of the present invention, the reaction components are used in novel proportions under suitable reaction conditions to produce resins of unexpected and important properties, e. g., insolubility and anion-exchange ability. Thus, the use at about 90° C. or below of ammonia (in the absence of other bases) in amounts at least chemically equivalent to the hydrocarbon dihalide employed results unexpectedly in insoluble reaction products. It is also significant that, among the reactants included in the scope of this invention, those containing functional groups separated by more than three contiguous carbon atoms, specifically those containing functional groups separated by six contiguous carbon atoms are particularly effective, for example, in producing a superior yield of the desired product as is seen from a comparison of Example II with Examples I and III.

By "dilute acid" in the phrase "dilute acid-insoluble" is meant 5% aqueous acetic acid.

By "dilute alkali" in the phrase "dilute alkali-insoluble" is meant 5% aqueous sodium hydroxide.

By "organic solvent insoluble" it is meant that the resin is substantially insoluble in the ordinary organic solvents, e. g., alcohols, ethers, esters, ketones, aliphatic and aromatic hydrocarbons and chlorinated hydrocarbons.

The above description and examples are intended to be illustrative only. Any modification of or variation therefrom which conforms to the spirit of the invention is intended to be included within the scope of the claims.

What is claimed is:

1. A water-insoluble, dilute acid-insoluble, dilute alkali-insoluble, organic solvent-insoluble, basic resinous reaction product substantially identical with that obtained by reacting a hydrocarbon dihalide wherein the halogens have an atomic weight greater than 35 and are attached to different, only singly bonded, aliphatic carbon at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of halogen in the dihalide.

2. A water-insoluble, dilute acid-insoluble, dilute alkali-insoluble, organic solvent-insoluble, basic resinous reaction product substantially identical with that obtained by reacting an alkylene dihalide wherein the halogens have an atomic weight greater than 35 and are attached to only singly bonded aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of halogen in the dihalide.

3. A water-insoluble, dilute acid-insoluble, dilute alkali-insoluble, organic solvent-insoluble, basic resinous reaction product substantially identical with that obtained by reacting an alkylene dichloride wherein the chlorine atoms are attached to only singly bonded aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of chlorine in the dichloride.

4. A water-insoluble, dilute acid-insoluble, dilute alkali-insoluble, organic solvent-insoluble, basic resinous reaction product substantially identical with that obtained by reacting a polymethylene dihalide wherein the halogens have an atomic weight greater than 35 and are attached to only singly bonded aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of halogen in the dihalide.

5. A water-insoluble, dilute acid-insoluble, dilute alkali-insoluble, organic solvent-insoluble, basic resinous reaction product substantially identical with that obtained by reacting a polymethylene dichloride wherein the chlorine atoms are attached to only singly bonded aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of chlorine in the dichloride.

6. A water-insoluble, dilute acid-insoluble, dilute alkali-insoluble, organic solvent-insoluble, basic resinous reaction product substantially identical with that obtained by reacting an alkylene dihalide wherein the halogens have an atomic weight greater than 35 and are attached to only singly bonded aliphatic carbons at a temperature within the range 30–90° C. with at least one molecular proportion of anhydrous ammonia for each atomic proportion of halogen in the dihalide at least until a water-insoluble, dilute acid-insoluble, dilute alkali-insoluble, organic solvent-insoluble, basic, resinous reaction product is obtained and isolating said resinous reaction product.

7. A water-insoluble, dilute acid-insoluble, dilute alkali-insoluble, organic solvent-insoluble, basic resinous reaction product substantially identical with that obtained by reacting a hydrocarbon dihalide wherein the halogens have an atomic weight greater than 35 are separated by at least six contiguous carbon atoms and are attached to different, only singly bonded, aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of halogen in the dihalide.

8. A water-insoluble, dilute acid-insoluble, dilute alkali-insoluble, organic solvent-insoluble, basic resinous reaction product substantially identical with that obtained by reacting an alkylene dichloride wherein the chlorine atoms are separated by at least six contiguous carbon atoms and are attached to only singly bonded aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of chlorine in the dichloride.

9. A water-insoluble, dilute acid-insoluble, dilute alkali-insoluble, organic solvent-insoluble, basic resinous reaction product substantially identical with that obtained by reacting a polymethylene dichloride wherein the chlorine atoms are separated by at least six contiguous carbon atoms and are attached to only singly bonded aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of chlorine in the dichloride.

10. A water-insoluble, dilute acid-insoluble, dilute alkali-insoluble, organic solvent-insoluble, basic resinous reaction product substantially identical with that obtained by reacting a polymethylene dichloride wherein the chlorine atoms are separated by at least six contiguous carbon atoms and are attached to only singly bonded aliphatic carbons at a temperature within the range 30–90° C. with at least one molecular proportion of anhydrous ammonia for each atomic proportion of chlorine in the dichloride at least until a water-insoluble, dilute acid-insoluble, dilute alkali-insoluble, organic solvent-insoluble, basic, resinous reaction product is obtained and isolating said resinous reaction product.

11. Process which comprises reacting a hydrocarbon dihalide wherein the halogens have an atomic weight greater than 35 and are attached to different, only singly bonded, aliphatic carbons, at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of halogen in the dihalide.

12. Process as in claim 11 wherein the halogens in the dihalide are separated by at least six contiguous carbon atoms.

13. Process which comprises reacting a hydrocarbon chloride wherein the chlorine atoms are attached to different, only singly bonded, aliphatic carbons at a temperature within the range 30–90° C. with anhydrous ammonia in the presence of an amino-hydrogen free base at least until a water-insoluble, dilute acid-insoluble, dilute alkali-insoluble, organic solvent-insoluble, basic, resinous reaction product is obtained and isolating said resinous reaction product, the ammonia and total base being employed in amount such that there is at least one-fourth molecular proportion of ammonia and a chemical equivalent of total base for each atomic proportion of chlorine in the dichloride.

14. Process as in claim 13 wherein the chlorine atoms in the dichloride are separated by at least six contiguous carbon atoms.

15. Process as in claim 13 wherein the dichloride is a polymethylene dichloride.

16. A water-insoluble, dilute acid-insoluble, dilute alkali-insoluble, organic solvent-insoluble, basic resinous reaction product substantially identical with that obtained by reacting ethylene dichloride at a temperature within the range 30–90° C. with anhydrous ammonia in the presence of an amino-hydrogen free base at least until a water-insoluble, dilute acid-insoluble, dilute alkali-insoluble, organic solvent insoluble, basic, resinous reaction product is obtained and isolating said resinous reaction product, the ammonia and total base being employed in amount such that there is at least one-fourth molecular proportion of ammonia and a chemical equivalent of total base for each atomic proportion of chlorine in the dichloride.

17. A water-insoluble, dilute acid-insoluble, dilute alkali-insoluble, organic solvent-insoluble, basic resinous reaction product substantially identical with that obtained by reacting hexamethylene dichloride at a temperature within the range 30–90° C. with anhydrous ammonia in the presence of an amino-hydrogen free base at least until a water-insoluble, dilute acid-insoluble, dilute alkali-insoluble, organic solvent insoluble, basic, resinous reaction product is obtained and isolating said resinous reaction product, the ammonia and total base being employed in amount such that there is at least one-fourth molecular proportion of ammonia and a chemical equivalent of total base for each atomic proportion of bromine in the dibromide.

GEORGE W. RIGBY